US005566279A

United States Patent [19]
Katayama

[11] Patent Number: 5,566,279
[45] Date of Patent: Oct. 15, 1996

[54] METHOD OF AND APPARATUS FOR READING OUT DIGITAL IMAGE DATA FROM THREE-DIMENSIONAL MEMORY

[75] Inventor: Yoichi Katayama, Tokyo, Japan

[73] Assignee: NEC Corporation, Tokyo, Japan

[21] Appl. No.: 243,851

[22] Filed: May 17, 1994

[30] Foreign Application Priority Data

May 17, 1993 [JP] Japan .................................. 5-114301
Jul. 9, 1993 [JP] Japan .................................. 5-170132

[51] Int. Cl.$^6$ .................................................. G06T 15/00
[52] U.S. Cl. .......................................................... 395/119
[58] Field of Search ................................... 382/154, 282, 382/305; 395/118, 119, 124

[56] References Cited

U.S. PATENT DOCUMENTS

| | | | |
|---|---|---|---|
| 4,835,688 | 5/1989 | Kimura | 364/413.22 |
| 4,987,554 | 1/1991 | Kaufman | 395/124 |
| 5,101,475 | 3/1992 | Kaufman et al. | 395/124 |
| 5,361,385 | 11/1994 | Bakalash | 395/124 |

OTHER PUBLICATIONS

Foley et al, "Computer Graphics: Principles and Practice, Second Edition," pp. 858–859, 1990.
Kaufman et al, "Voxel–Based Processing," IEEE Computer Graphics & Applications, Nov. 88, pp. 10–23.
Fujimoto et al., "ARTS: Accelerated Ray–Tracing System", IEEE Computer Graphics & Application, vol. 6, No. 4, pp. 16–26 (Apr. 1986).

Tayama et al., "A Speedy Voxel–Tracing Method for Cutting Solid Display of 3-D Images", *Journal of Theses of the Electronic Communications Information Society*, D–II, vol. J72–d–II, No. 9, pp. 1,332–1,340 (Sep. 1989).
Zhang et al., "A Fast Voxel Traversal Algorithm by LCDDA Method for Ray Tracing and Its Hardware Implementation", *Journal of Theses of the Electronic Communications Information Society*, D–II, vol. J74–D–II, No. 6, pp. 708–717 (Jun. 1991).

*Primary Examiner*—Heather R. Herndon
*Assistant Examiner*—Rudolph Buchez
*Attorney, Agent, or Firm*—Foley & Lardner

[57] ABSTRACT

A three-dimensional image processing apparatus and method wherein a three-dimensional digital image in a three-dimensional memory is cut and read out to perform image processing. Addresses of a two-dimensional digital differential analyzer are first calculated by ray tracing in a direction of a vector on one plane of a three plane coordinate system of a three-dimensional coordinate system, and then data of voxel columns, arranged perpendicularly to the one plane coordinate system in the three-dimensional space along straight lines perpendicular to the ray at the addresses, are read out in units of a column for the individual voxel columns from the three-dimensional memory. A pair of three-dimensional memories are utilized, and a writing operation of a three-dimensional digital image into one of the three-dimensional memories and a reading out operation of the voxel columns from the other three-dimensional memory are performed simultaneously in a parallel relationship.

9 Claims, 10 Drawing Sheets

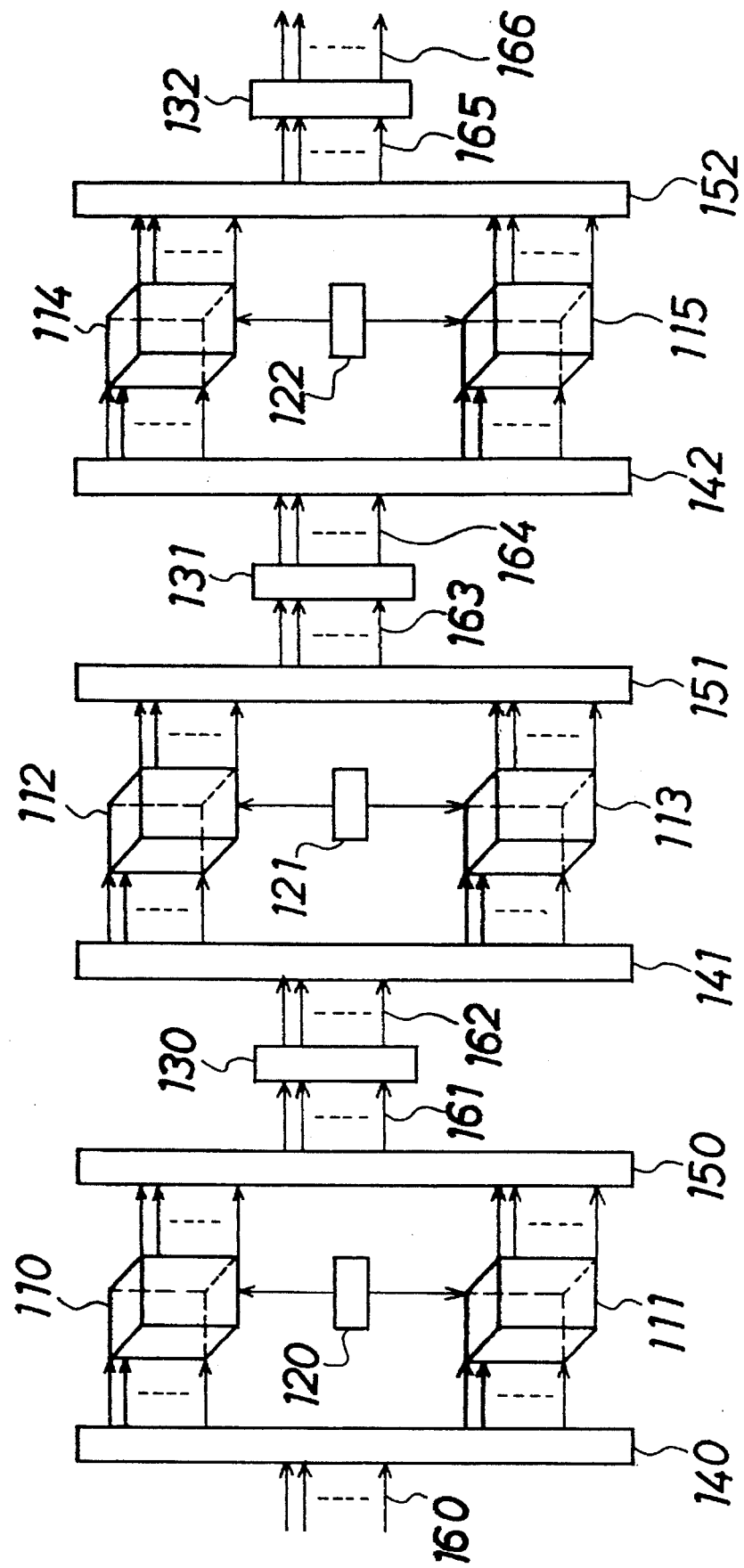

FIG.10

| | | |
|---|---|---|
| (1) | PARALLEL MOVEMENT | $c_{31}$ (x-AXIS DIRECTION)<br>$c_{32}$ (y-AXIS DIRECTION)<br>$b_{32}$ (z-AXIS DIRECTION) |
| (2) | EXPANSION/ CONTRACTION | $c_{11}=c_{21}=A$   (x-AXIS DIRECTION)<br>$c_{12}=c_{22}=B$   (y-AXIS DIRECTION)<br>$b_{12}=b_{22}=C$   (z-AXIS DIRECTION) |
| (3) | SHEARING | $b_{21}=0, a_{11}=a_{22}=b_{11}=b_{22}=1$<br>$x'=x+c_{21}y+a_{21}c_{21}z$<br>$y'=c_{12}x+y+a_{21}z$<br>$z'=b_{12}x+a_{12}y+z$ |
| (4) | ROTATION | $a_{11}=a_{22}=\cos(O_x), -a_{12}=a_{21}=\sin(O_x)$   (ROTATION BY $O_x$ AROUND x-AXIS)<br>$b_{11}=b_{22}=\cos(O_y), b_{12}=-b_{21}=\sin(O_y)$   (ROTATION BY $O_y$ AROUND y-AXIS)<br>$c_{11}=c_{22}=\cos(O_z), -c_{12}=c_{21}=\sin(O_z)$   (ROTATION BY $O_z$ AROUND z-AXIS) |

METHOD OF AND APPARATUS FOR READING OUT DIGITAL IMAGE DATA FROM THREE-DIMENSIONAL MEMORY

BACKGROUND OF THE INVENTION

1. Field of the Invention

This invention relates to a three-dimensional image processing method and apparatus for analyzing a three-dimensional image obtained, for example, by computed tomography or magnetic resonance imaging used to make a diagnosis of an organ of a human being or processing a three-dimensional image by three-dimensional image processing for three-dimensional computer graphics, and more particularly to a three-dimensional image processing method and apparatus by which a three-dimensional image is once stored as a three-dimensional digital image into a three-dimensional memory and then the three-dimensional digital image is read out cutting it in a three-dimensional space and processed by image processing.

2. Description of the Related Art

A ray tracing voxel traversal algorithm wherein a three-dimensional space is divided into a large number of cubic voxels and a three-dimensional digital image is divided into voxels and stored into a three-dimensional memory and then a ray (3D line) is forwarded straightforwardly into the three-dimensional space to designated addresses of voxels through which the ray passes to read out the data at the addresses, and a three-dimensional image processing method which makes use of the ray tracing voxel traversal algorithm, are known, for example, from the articles published in the following documents:

1. A. FUJIMOTO, T. TANAKA and K. IWATA, "ARTS: Accelerated Ray-Tracing System", IEEE Computer Graphics & Application, 6, 4, pp. 16–26, April 1986;
2. S. ZHANG, P. ZHENG and Y. AOKI, "A Fast Voxel Traversal Algorithm by LCDDA Method for Ray Tracing and Its Hardware Implementation", Journal of Theses of the Electronic Communications Information Society, D-II, Vol. J74-D-II, No. 6, pp. 708–717, June 1991; and
3. N. TAYAMA, N. SHIMIZU, N. CHIBA and OTAWARA, "A Speedy Voxel-Tracing Method for Cutting Solid Display of 3.D Images", Journal of Theses of the Electronic Communications Information Society, D-II, Vol. J72-D-II, No. 9, pp. 1,332–1,340, September 1989.

Fujimoto discloses a method wherein a three-dimensional digital differential analyzer (hereinafter referred to as 3D–DDA) of ray tracing is realized using a two-dimensional digital differential analyzer (hereinafter referred to as 2D–DDA) of two orthogonal two-dimensional planes. Thang and Tayama disclose different methods wherein a technique of 2D–DDA is extended to 3D–DDA such that individual voxels are stepped forwardly and backwardly in the advancing direction of a ray to generate addresses for the voxels so that no address drop may occur.

The methods, however, require a long time to, for example, display an image three-dimensionally on a display screen or analyze an image since, when a three-dimensional digital image in a three-dimensional memory is cut and read out by a 3D–DDA, one voxel is designated for each reading cycle to repetitively read out voxel data one by one.

SUMMARY OF THE INVENTION

It is an object of the present invention to provide a three-dimensional image processing method and apparatus by which the time required for processing of a three-dimensional digital image is reduced.

It is another object of the present invention to provide a three-dimensional image processing method and apparatus by which 3D–DDA can be realized efficiently.

In order to attain the objects described above, according to an aspect of the present invention, there is provided a three-dimensional image processing method wherein a three-dimensional digital image stored in a three-dimensional memory is read out by successively designating addresses of voxels by ray tracing processing, which comprises the steps of calculating addresses by ray tracing of a two-dimensional digital differential analyzer in a direction of a vector on one of three plane coordinate systems of a three-dimensional coordinate system, and reading out data of voxel columns arranged perpendicularly to the one plane coordinate system in the three-dimensional space along straight lines perpendicular to the ray at the addresses in units of a column for the individual voxel columns from the three-dimensional memory.

According to another aspect of the present invention, the three-dimensional image processing method is put into practice by a three-dimensional image processing apparatus, which comprises a three-dimensional memory for storing a three-dimensional digital image for voxels in a three-dimensional space, a two-dimensional digital differential analyzer address generation circuit for generating addresses along a ray in a direction of a vector on one plane of a three plane coordinate system of a three-dimensional coordinate system, and means for repetitively reading out data of voxel columns arranged perpendicularly to the plane coordinate system in the three-dimensional space along a straight line perpendicular to a ray at the addresses in units of a column for the individual columns from the three-dimensional memory.

The three-dimensional memory may include a pair of three-dimensional memories such that a writing operation of a three-dimensional digital image into one of the three-dimensional memories and a reading out operation of the voxel columns from the other three-dimensional memory are performed simultaneously in a parallel relationship. Because into and reading out from the three-dimensional memories can be performed simultaneously in a parallel relationship, the operation can be performed at a higher speed.

Such reading out for the individual voxel columns making use of 2D–DDA as described above can be performed for the first and second perpendicular directions of the three-dimensional coordinate system. In this instance, according to a further aspect of the present invention, a three-dimensional image processing method wherein a three-dimensional digital image stored in a three-dimensional memory is read out by successively designating addresses of voxels by ray tracing processing comprises the steps of calculating first addresses by ray tracing of a two-dimensional digital differential analyzer in a direction of a vector on a first one of three plane coordinate systems of a three-dimensional coordinate system, reading out data of voxel columns arranged perpendicularly to the first plane coordinate system in the three-dimensional space along straight lines perpendicular to the ray at the first addresses in units of a column for the individual voxel columns from the first three-dimensional memory and storing the thus read out data into a second three-dimensional memory, calculating second addresses by ray tracing of the two-dimensional digital differential analyzer in a direction of the vector on a second one of the plane coordinate systems perpendicular to the first plane coordinate system, and reading out data of voxel columns arranged perpendicularly to the second plane coordinate system in the three-dimensional space along straight lines perpendicular to the ray at the second addresses in units of a column for the individual voxel columns from the second three-dimensional memory.

After the individual voxel columns are read out for the first and second perpendicular directions of the three-dimensional coordinate system using 2D-DDA to rewrite data for the voxel columns from the first three-dimensional memory to the second three-dimensional memory, the three-dimensional image processing method may additionally comprise, for the third perpendicular direction, the steps of performing ray tracing of the two-dimensional digital differential analyzer for a plurality of rays parallel to the direction of the vector on a third one of the plane coordinate systems in a sectional plane in the three-dimensional space for which data of the voxel columns are read out and calculating third addresses for the individual rays, and reading out those of the data of voxels of voxel columns read out from the second three-dimensional memory which are designated by the third addresses.

According to a still further aspect of the present invention, the three-dimensional image processing method is put into practice, where the additional steps are not comprised, by a three-dimensional image processing apparatus, which comprises first and second three-dimensional memories for storing a three-dimensional digital image for voxels in a three-dimensional space, a first two-dimensional digital differential analyzer address generation circuit for generating first addresses along a ray in a direction of a vector on a first one of three plane coordinate systems of a three-dimensional coordinate system, means for repetitively reading out data of voxel columns arranged perpendicularly to the first plane coordinate system in the three-dimensional space along a straight line perpendicular to a ray at the first addresses in units of a column for the individual columns from the first three-dimensional memory and writing the thus read out data into the second three-dimensional memory, a second two-dimensional digital differential analyzer address generation circuit for generating second addresses along the ray in the direction of the vector on a second one of the plane coordinate systems perpendicular to the first plane coordinate system, and means for repetitively reading out data of voxel columns arranged perpendicularly to the second plane coordinate system in the three-dimensional space along a straight line perpendicular to the ray at the second addresses in units of a column for the individual voxel columns from the second three-dimensional memory.

Where the three-dimensional image processing method comprises the additional steps described above, the three-dimensional image processing apparatus further comprises a plurality of third two-dimensional differential analyzer address generation circuits for performing ray tracing of the two-dimensional digital differential analyzer for a plurality of rays parallel to the direction of the vector on a third one of the plane coordinate systems in a sectional plane in the three-dimensional space for which data of voxel columns are read out by the reading out means and calculating third addresses for the individual rays, and means for extracting those of the data of voxels of the voxel columns read out from the second three-dimensional memory which are designated by the third addresses generated from the third two-dimensional differential analyzer address generation circuits.

An interpolation circuit may be interposed between the first and second three-dimensional memories for interpolating data.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 9 is a block diagram of a further three-dimensional image processing apparatus showing a third preferred embodiment of the present invention; and FIG. 10 is a table illustrating the relationship between three-dimensional affine transformation and matrix transformation performed by the three-dimensional image processing apparatus shown in FIG. 9.

DETAILED DESCRIPTION OF THE PREFERRED EMBODIMENTS

Figure 1:
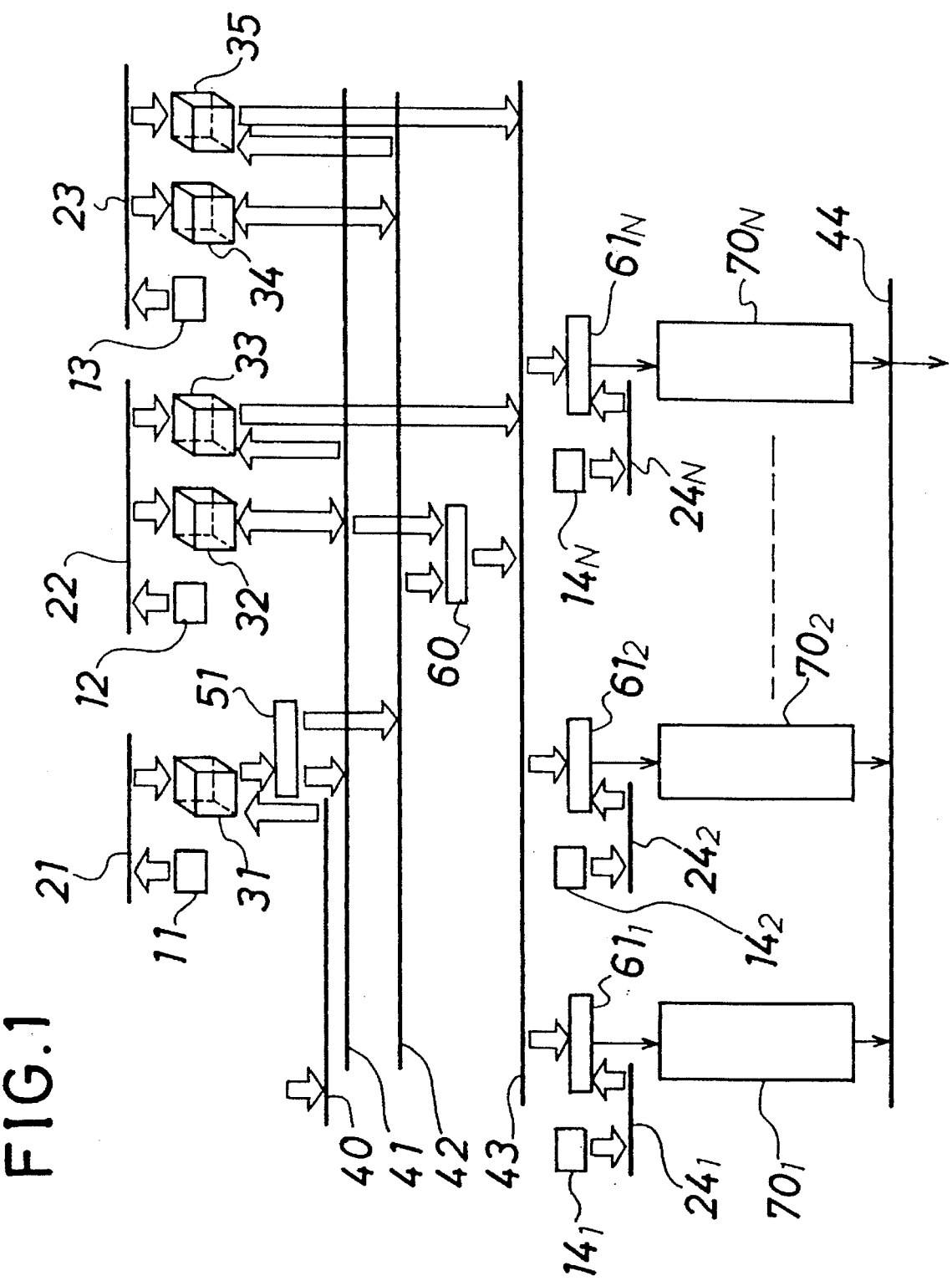
FIG. 1 is a block diagram of a three-dimensional image processing apparatus showing a first preferred embodiment of the present invention.

Referring first to FIG. 1, there is shown a three-dimensional image processing apparatus according to a first preferred embodiment of the present invention. The three-dimensional image processing apparatus shown includes a single first three-dimensional memory 31, a two-dimensional digital differential analyzer address generation circuit 11 and an address bus 21 for the first three-dimensional memory 31, four second three-dimensional memories 32, 33, 34 and 35, a two-dimensional digital differential analyzer address generation circuit 12 and an address bus 22 for causing the three-dimensional memories 32 and 33 to perform a double buffer operation, a two-dimensional digital differential analyzer address generation circuit 13 and an address bus 23 for causing the other three-dimensional memories 34 and 35 to similarly perform a double buffer operation, N (for example, 256) processors $70_1$ to $70_N$, N multiplexers $61_1$ to $61_N$ corresponding to the processors $70_1$ to $70_N$, respectively, N two-dimensional digital differential analyzer address generation circuits $14_1$ to $14_N$, and N address buses $24_1$ to $24_N$.

The three-dimensional image processing apparatus further includes a data bus 40 for inputting a three-dimensional digital image from the outside to the first three-dimensional memory 31, another data bus 41 interconnecting the first three-dimensional memory 31 and the second three-dimensional memories 32 and 33, a further data bus 42 interconnecting the first three-dimensional memory 31 and the other second three-dimensional memories 34 and 35, and a still further data bus 43 interconnecting the second three-dimensional memories 32, 33, 34 and 35 and the multiplexers $61_1$ to $61_N$. The multiplexers $61_1$ to $61_N$ are connected in parallel to the data bus 42.

The three-dimensional image processing apparatus further includes a demultiplexer 51 for selectively outputting data read out from the first three-dimensional memory 31 to the data bus 41 or or the data bus 42 in order to allow one of the two sets of second three-dimensional memories 32, 33 and 34, 35 to perform writing of data while the other set of second three-dimensional memories performs reading out of data, and a multiplexer 60 for switchably connecting the data bus 41 or the data bus 42 to the data bus 43.

Figure 2:
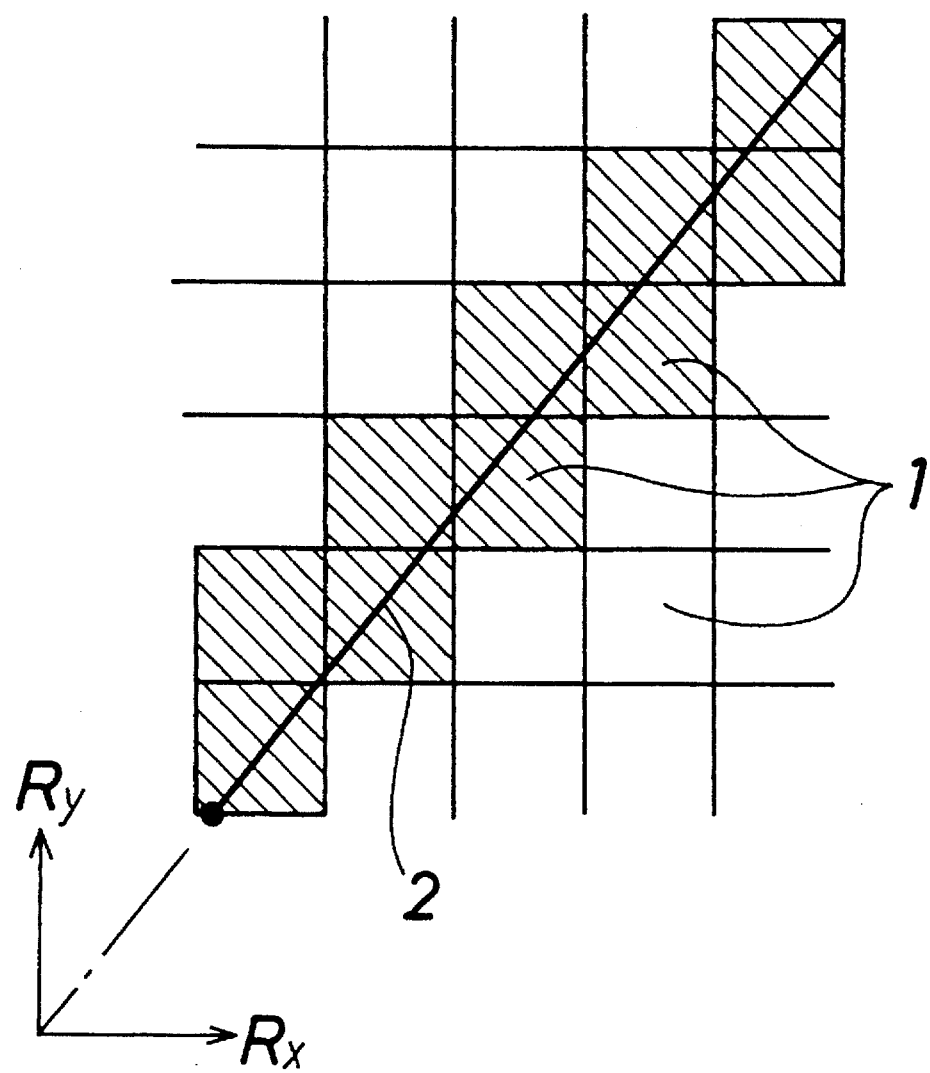
FIG. 2 is a diagrammatic view illustrating the address calculation algorithm of a two-dimensional digital differential analyzer address generation circuit of the three-dimensional image processing apparatus shown in FIG. 1.

Each of the two-dimensional digital differential analyzer address generation circuits (hereafter referred to simply as address generation circuits) 11, 12, 13 and $14_1$ to $14_N$ generates an address on a two-dimensional plane coordinate system by ray tracing of 2D–DDA. The address generation process adopted by the address generation circuits is performed, assuming that a ray 2 advances straightforwardly from a view point P toward a target through a large number of pixels 1, into which a plane is divided, in the following procedure similarly as in the method disclosed in Tayama, the disclosure of which is incorporated herein by reference, mentioned hereinabove:

Step 1:
The advancing direction of the ray 1s represented by a vector $(R_x, R_y)$, and the direction of a greater one of $R_x$ and $R_y$ is determined as reference direction (driving axis in FIG. 2) and the direction of a smaller one of $R_x$ and $R_y$ is determined as non-reference direction (passive axis in FIG. 2).

Step 2:
The increment in the reference direction is set to 1 while the increment in the non-reference direction is calculated from an inclination ($R_x/R_y$ when $R_x \leq R_y$, but $R_y/R_x$ when $R_x > R_y$) of the ray to determine the increments of stepping in the two directions.

Step 3:
The addresses of a first pixel are outputted from the integral portions of the coordinates of the start point of the segment of the ray.

Step 4:
The DDA (digital differential analyzer) is stepped by one step forwardly (extending the segment by adding the increments in the two directions), and from the integral portions of the new coordinates obtained by such stepping, addresses are prepared as a candidate for a next pixel. If the new coordinate position is outside the object area for tracing, then the processing is ended. However, if the new coordinate position is within the object area for tracing, them:

i. if the integral parts of the coordinates in the two directions both exhibit the increase of +1, it is determined that the segment may possibly have passed another pixel prior to the pixel candidate prepared at step 4 above, and the process advances to next step 5, but ii. otherwise, it is determined that the segment subsequently passes the prepared pixel candidate, and the addresses of the pixel candidate are outputted.

Thereafter, the process returns to step 4 to repeat the same operation.

Step 5:
If the decimal part of the coordinate in the non-reference direction is i. not equal to 0, then it is determined that the segment has passed, before it passes the pixel candidate, another pixel of the address at which the integral part of the coordinate in the reference direction changes by −1, and the addresses of the pixel are outputted, and whereafter the addresses of the pixel candidate are outputted and then the process returns to step 4, but ii. equal to 0, it is determined that the segment has not passed another pixel, and the addresses of the pixel candidate are outputted, whereafter the process returns to step 4.

Figure 3:
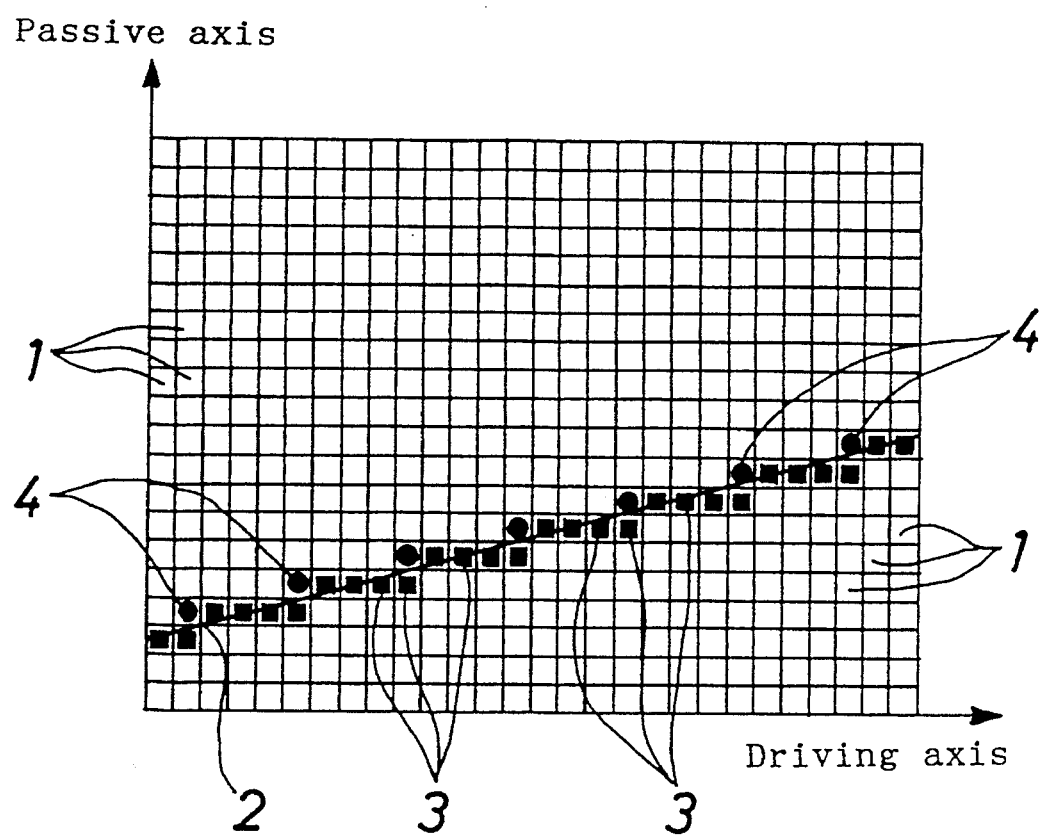
FIG. 3 is a diagrammatic view showing the positions of calculated addresses on a two-dimensional plane coordinate system.

FIG. 3 illustrates addresses generated in such a manner as described above. In FIG. 3, each square painted out mark 3 represents the address in the reference direction, and each circular painted out mark 4 represents the address In the non-reference direction. The address in the reference direction is used for one of the two three-dimensional memories 32 and 33 which make up a set which performs a double buffer operation, and the address in the non-reference direction is used for the other of the two three-dimensional memories 32 and 33. This similarly applies to the three-dimensional memories 34 and 35 which makes the other set.

After a three-dimensional digital image inputted from the data bus 40 is completely stored into the first three-dimensional memory 31, the three-dimensional image processing apparatus processes in the following manner.

Figure 4:
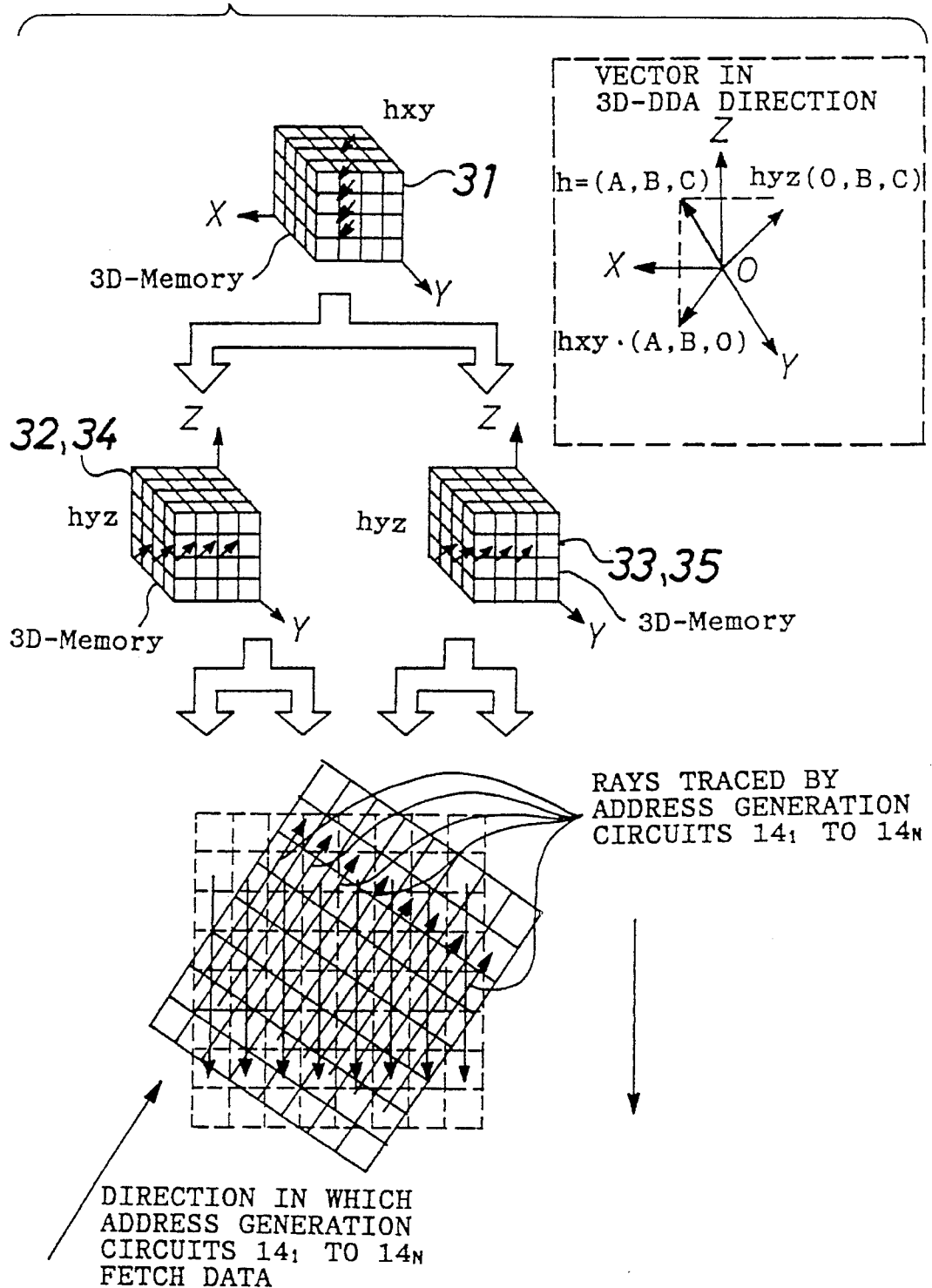
FIG. 4 is a flow diagram illustrating three different stages of processing performed by the three-dimensional image processing apparatus shown in FIG. 1.
Figure 5:
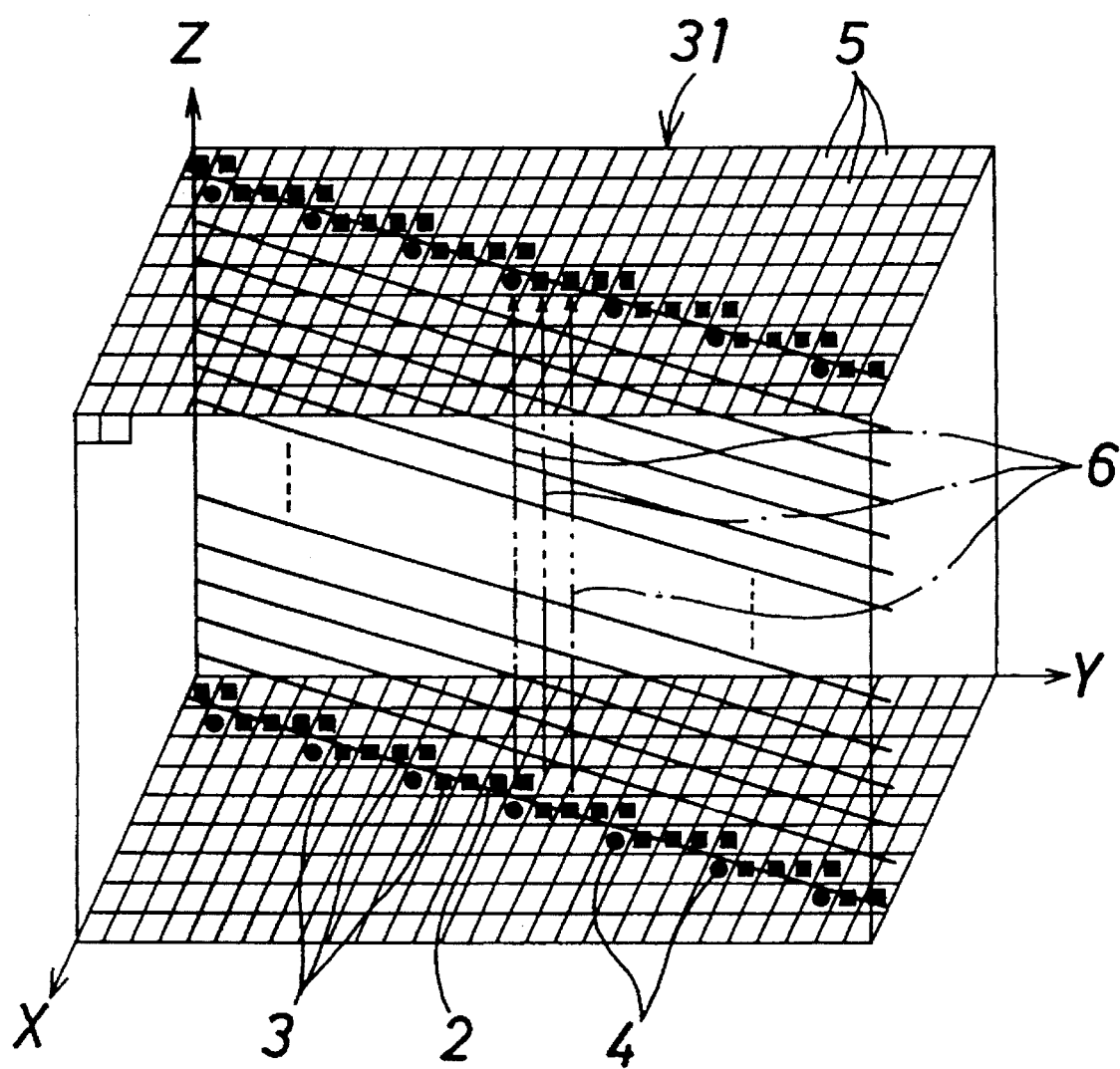
FIG. 5 is a diagrammatic view illustrating the method of reading out voxel data from a three-dimensional memory at the first stage of processing.

In order to realize 3D–DDA for a vector h =(A, B, C) in an arbitrary direction in the three dimensions as illustrated in FIG. 4, the address generation circuit 11 first calculates an address by ray tracing of 2D–DDA in a vector direction hxy=(A, B, 0) in the XY plane. In FIG. 5, a manner of storage in the first three-dimensional memory 31 is illustrated in an XYZ three-dimensional space model, and a ray 2 of 2D–DDA, addresses 3 in the reference direction and addresses in the non-reference direction are shown on the XY plane of the XYZ three-dimensional space model in a similar manner as in FIG. 3. In FIG. 5, one square indicates one voxel 5.

After the addresses on the XY plane calculated in this manner are supplied to the first three-dimensional memory 31 by way of the address bus 21, data of voxel columns perpendicular to the XY plane along straight lines 6 perpendicular to the ray 2 on the addresses 3 or 4 in FIG. 5 are read out in units of a column from the first three-dimensional memory 31. In other words, when a sectional plane which extends perpendicularly to the Z-axis direction along the ray 2 on the XY plane in the three-dimensional space of FIG. 5 is presumed, the data in the first three-dimensional memory 31 are read out such that the voxel columns of the Z-axis direction in the sectional plane are cut successively one by one along the ray 2.

The voxel column data read out in this manner are outputted to one of the data bus 41 and the data bus 42 selected by the demultiplexer 51. When the data bus 41 is selected, the data are written into the three-dimensional memories 32 and 33 of the first set, but when the data bus 42 is selected, the data are written into the three-dimensional memories 34 and 35 of the second set. In the two sets of three-dimensional memories, the data according to the addresses 3 in the reference direction are written into the three-dimensional memories 32 and 34 while the data according to the addresses 4 in the non-reference direction are written into the three-dimensional memories 33 and 35.

After data are written into one of the two sets of three-dimensional memories 32, 33 and 34, 35, data are written into the other set while the data are simultaneously read out from the first set. The reading out proceeds in the following manner commonly to both sets.

Figure 6:
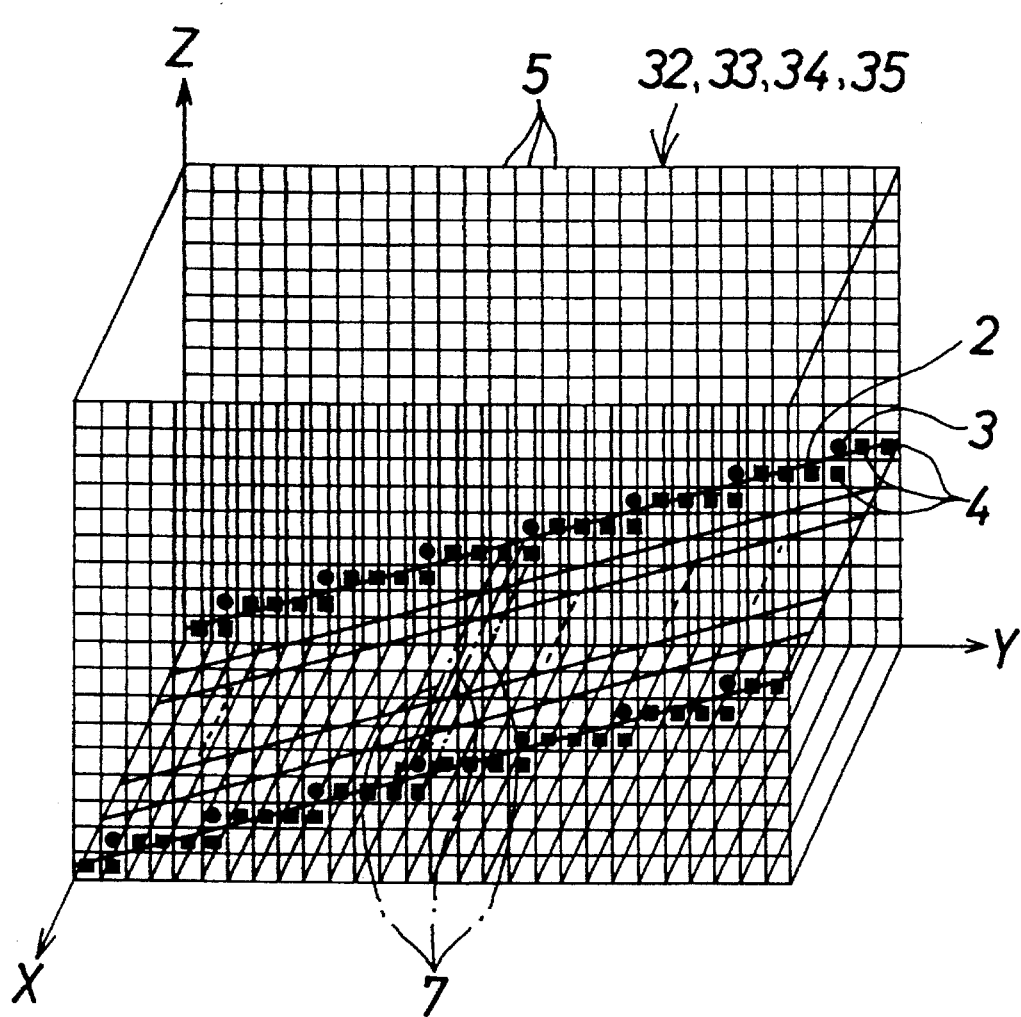
FIG. 6 is a similar view but illustrating the method of reading out voxel data from the three-dimensional memory at the second stage of processing.

The address generation circuits 12 and 13 calculate addresses by ray tracing of 2D–DDA in a vector direction hyz=(0, B, C) on the YZ plane as seen from FIG. 4. In FIG. 6, a manner of storage in the three-dimensional memories 32, 33, 34 and 35 is illustrated in an XYZ three-dimensional space model, and the ray 2 of 2D–DDA, the addresses 3 in the reference direction and the addresses 4 in the non-reference direction are shown in FIG. 6 in a similar manner as described above.

After the addresses in the XZ plane calculated in such a manner as described above are supplied from the address generation circuit 12 to the second three-dimensional memories 32 and 33 of the first set by way of the address bus 22 and also from the address generation circuit 13 to the second three-dimensional memories 34 and 35 of the second set by way of the address bus 23, data In voxel columns perpendicular to the YZ plane along straight lines 7 perpendicular to the ray 2 on the addresses 3 or 4 are read out in units of a column from the three-dimensional memories 32 and 33 or 34 and 35. In particular, when a sectional plane which extends in the X-axis direction along the ray 2 on the YZ plane in the three-dimensional space of FIG. 6 is presumed, the data in the three-dimensional memories 32 and 33 or 34 and 35 are read out such that the voxel columns of the Z-axis direction in the sectional plane are cut successively one by one along the ray 2.

The voxel column data read out from the three-dimensional memory 32 are outputted to the data bus 41, and the voxel column data read out from the three-dimensional memory 34 are outputted to the data bus 42. Then, the voxel column data on the data bus 41 or the voxel column data on the data bus 42 are selectively transferred to the data bus 43 by the multiplexer 60. Meanwhile, the voxel data read out from the three-dimensional data 33 and 35 are directly transferred to the data bus 43.

To the N multiplexers $60_1$ to $60_N$ connected in parallel to the data bus 43, addresses from the corresponding address generation circuits $14_1$ to $14_N$ are supplied by way of the address buses $24_1$ to $24_N$, respectively. The address generation circuits $14_1$ to $14_N$ individually calculate addresses by ray tracing of 2D–DDA in a direction parallel to a vector direction hXZ=(A, 0, C) on the XZ plane in the following manner.

Figure 7:
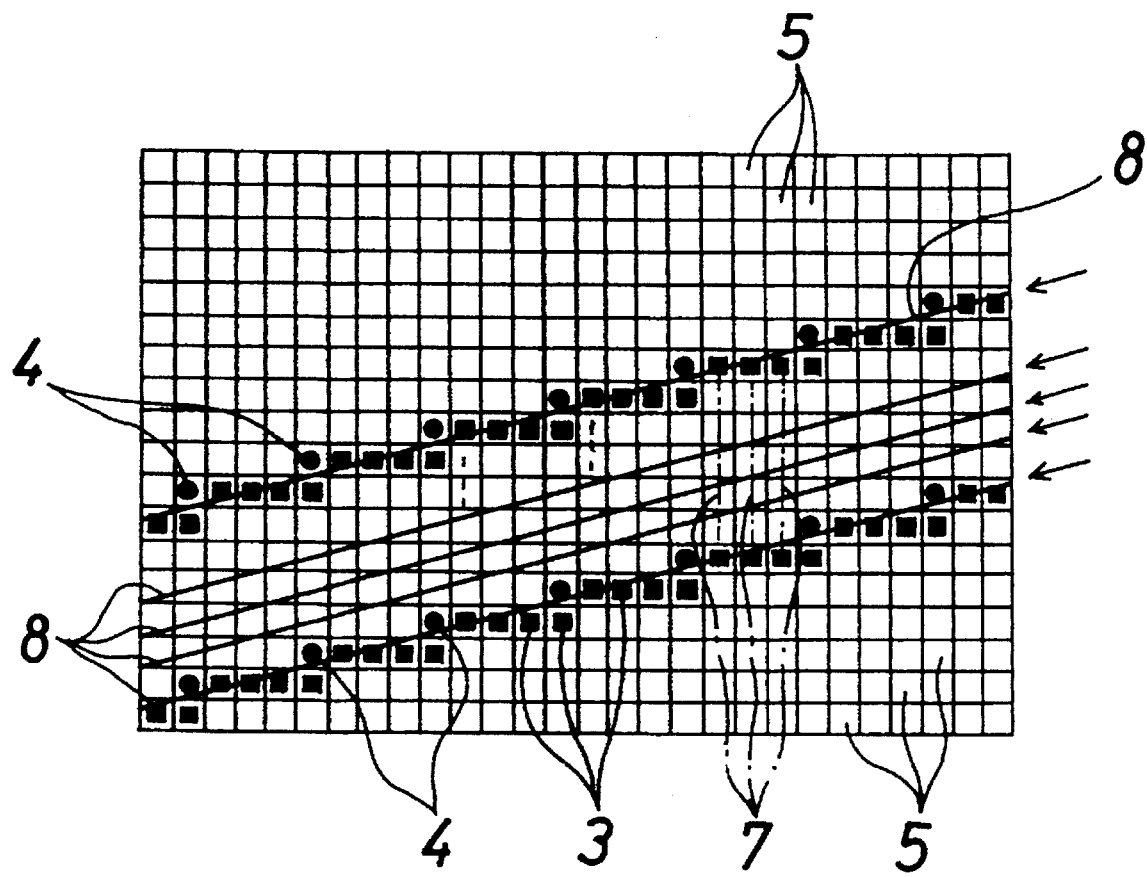
FIG. 7 is a similar view but illustrating the process at the third stage of extracting voxel data read out at the second stage.

FIG. 7 shows only a sectional plane taken in the X-axis direction along the ray 2 on the XZ plane in FIG. 6. When N rays 8 which advance in a direction parallel to the vector direction hXZ =(A, 0, C) on the XZ plane in the sectional plane so that they cross with the straight lines 7 are presumed, the address generation circuits $14_1$ to $14_N$ generate addresses by ray tracing of 2D–DDA for the individual corresponding rays 8 in the reference direction and the non-reference direction similarly as described above.

Data are successively transferred to the data bus 43 for the individual voxel columns arranged along each straight line 7 as described above. Meanwhile, the N address generation circuits $14_1$ to $14_N$ individually generate addresses along N parallel rays 8 perpendicular to the straight lines 7. The address generation circuits $14_1$ to $14_N$ supply the addresses generated along the rays 8 perpendicular to the voxel columns arranged along the straight lines 7 to the corresponding multiplexers $60_1$ to $60_N$, respectively.

Accordingly, the first one of the N multiplexers $60_1$ to $60_N$, that is, the multiplexer $60_1$, successively extracts data of voxels along the first ray 8 one by one for the voxels from among the voxel column data on the data bus 43 and fetches them into the processor $70_1$. Similarly, the second multiplexer 602 successively extracts data of voxels along the second ray 8 one by one for the voxels from among the voxel column data on the data bus 43 and fetches them into the processor 702. Similarly, the third to the Nth multiplexers $60_3$ to $60_N$ successively extract data of voxels along the third to the Nth rays 8 one by one for the voxels among the voxel column data on the data bus 43 and fetch them into the corresponding processors $70_3$ to $70_N$, respectively. FIG. 4 illustrates the relationship of the direction in which data are written into the three-dimensional memories 32 to 35 to the ray tracing direction and the data fetching direction of the address generation circuits $14_1$ to $14_N$.

The N processors $70_1$ to $70_N$ individually process the voxel data fetched therein from the data bus 43 by image processing conventionally known such as, for example, binary digitization, removal of noise, filtering, emphasis, threshold level processing, domain division, profile analysis processing, structure recognition, stereoscopic vision and/or volume visualization, and then output resulted data parallelly at a time to the data bus 44 for external outputting.

Figure 8:
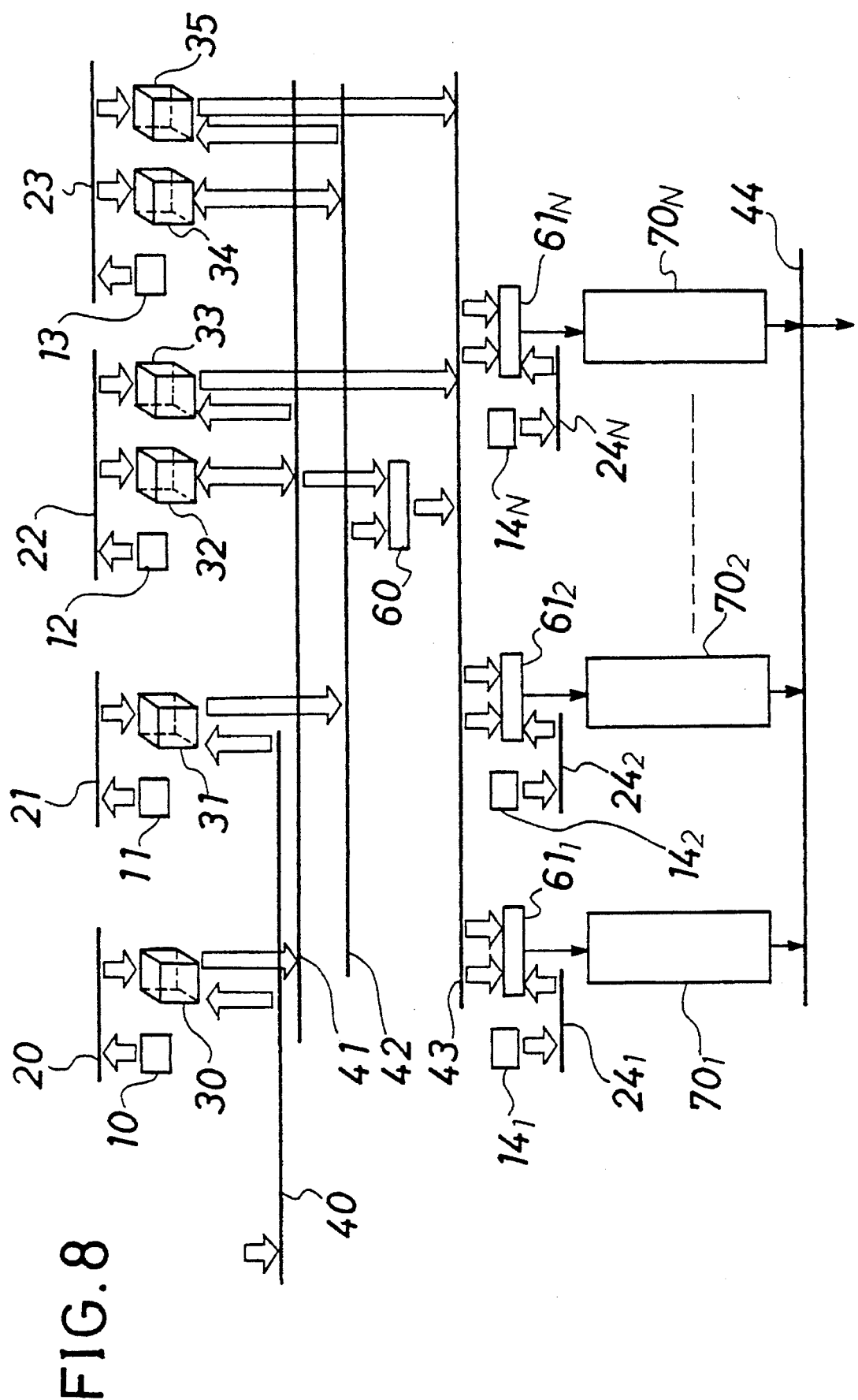
FIG. 8 is a block diagram of another three-dimensional image processing apparatus showing a second preferred embodiment of the present invention.

FIG. 8 shows another image processing apparatus to which the present invention is applied. The apparatus shown in FIG. 8 is a modification to and different from the image processing apparatus described hereinabove with reference to FIG. 1 In that it includes several additional elements. In particular, the image processing apparatus of FIG. 8 additionally includes, in addition to the set of the first three-dimensional memory 31, the address generation circuit 11 and the address bus 21, another set of a three-dimensional memory 30, an address generation circuit 10 and an address bus 20 and is constructed such that, after writing of data into one of the two sets comes to an end, writing of data into the other set is performed while at the same time reading from the one set is performed in a parallel relationship. Where the construction Just described is employed, even if three-dimensional digital images are successively inputted to the image processing apparatus, they can be processed on the real time basis.

In the image processing apparatus of the two embodiments described above, where the storage area (voxel number) of each three-dimensional memory is, for example, $253^3$, If it is assumed that, for the depthwise direction of the three-dimensional space, ray tracing is performed to a half depth (256/2=128) on the average; each voxel data is formed from 1 byte; and the number of slice planes (sectional planes) from which data are to be extracted is 128, which corresponds to one half the three-dimensional space in the depthwise direction, and interpolation is performed for voxels between adjacent slice planes, the processing time can be calculated in the following manner.

If writing and reading out of data into and from each three-dimensional memory is performed at 20 MHz, then the required time when data are read out from the three-dimensional memories of the two sets in accordance with the conventional 3D–DDA method without arranging the two sets of three-dimensional memories in parallel to each other is 50 (nsec)×$256^2$×128=419 (ms). In contrast, where the two sets of three-dimensional memories are arranged in parallel as in the two embodiments of the present invention described above, the required time is 50 (nsec)×256×256= 3.3 (ms). Accordingly, data can be read out at a very high speed of 128 times that of the conventional method. In addition, what is important with the two embodiments of the present invention is that 2D–DDA is performed for two perpendicular planes, and data of voxel columns perpendicular to the planes, along straight lines perpendicular to rays at individual addresses in the three-dimensional space are read out in units of a column of voxels from the three-dimensional memories, and accordingly, higher rate operation can be achieved.

FIG. 9 shows a further image processing apparatus to which the present invention is applied. In the image processing apparatus of the present embodiment, In order to perform parallel processing and interpolation calculation for three plane coordinates of a three-dimensional space on three pairs of three-dimensional memories prepared for the Individual plane coordinates, the following three sets are included.

Referring to FIG. 9, the first set is provided to perform two-dimensional affine transform of YZ plane coordinates of the three-dimensional space and includes a pair of three-dimensional memories 110 and 111, a first input change-over circuit 140 for selectively inputting an input signal to the three-dimensional memory 110 or 111, a first output change-over circuit 150 for selectively outputting an output signal of the three-dimensional memory 101 or 102, and a first address generation circuit 120 for generating addresses of 2D–DDA on the YZ plane.

The second set is provided to perform two-dimensional affine transform of XZ plane coordinates and includes a pair of three-dimensional memories 112 and 113, a second input change-over circuit 141 for selectively inputting an input signal to the three-dimensional memory 112 or 118, a second output changeover circuit 151 for selectively outputting an output signal from the three-dimensional memory 112 or 113, and a second address generation circuit 121 for generating address of 2D–DDA on the XZ plane.

The third set is provided to perform two-dimensional affine transform of XY plane coordinates and includes a pair of three-dimensional memories 114 and 115, a third input change-over circuit 142 for selectively inputting an input signal to the three-dimensional memory 114 or 115, a third output changeover circuit 152 for selectively outputting an output signal of the three-dimensional memory 114 or 115, and a third address generation circuit 122 for generating addresses of 2D–DDA on the XY plane.

An input data bus 160 to which a three-dimensional image is inputted is connected to the first input change-over circuit 140. A first Interpolation circuit 130 is connected between the first output change-over circuit 150 and the second input change-over circuit 141 by way of a pair of data buses 161 and 162. A second interpolation circuit 131 is connected between the second output change-over circuit 151 and the third input change-over circuit 142 by way of another pair of data buses 163 and 164. A third interpolation circuit 132 is connected to the third output change-over circuit 152 by way of a data bus 165, and an output data bus 166 is connected to the third interpolation circuit 132.

The six three-dimensional memories 110 to 115 are controlled to perform writing and reading out in the following two operation modes in accordance with switching operations of the input change-over circuits 140, 141 and 142 and the output change-over circuits 150, 151 and 152.

In the first operation mode, when data inputted by way of the input data bus 160 are written into the memory 111, data written in the memory 110 in advance are read out and written into the memory 113 by way of the first interpolation circuit 130 while data written in the memory 112 are read out and written into the memory 115 by way of the second interpolation circuit 131. Further, data written in the memory 114 are outputted by way of the third interpolation circuit 132.

In the second operation mode, when data inputted by way of the input data bus 160 are written into the memory 110, data written in advance in the memory 111 are read out and written into the memory 112 by way of the first interpolation circuit 130 while data written in the memory 113 are read out and written into the memory 114 by way of the second interpolation circuit 131. Further, data written in the memory 115 are outputted by way of the third interpolation circuit 132.

The first address generation circuit 120 calculates addresses (transform coordinates) in accordance with the expression (1) given below and reads out voxel data of the memory 110 or 111 using the addresses in units of a column for the voxel columns arranged linearly similarly as in the embodiments described hereinabove:

$$[x_1 y_1 z_1 1] = [x'y'z'] \begin{bmatrix} 1 & 0 & 0 & 0 \\ 0 & a_{11} & a_{12} & 0 \\ 0 & a_{21} & a_{22} & 0 \\ 0 & 0 & 0 & 1 \end{bmatrix} \quad (1)$$

where $[x_1\ y_1\ z_1\ 1]$ represents coordinates from which data are to be read out, and $[x'y'z'9]$ represents coordinates before such reading out. Generally, $x_1$, $y_1$ and $z_1$ of $[x_1\ y_1\ z_1]$ are decimals. Therefore, the second interpolation circuit 131 is required. The second interpolation circuit 131 performs optimum calculation depending upon the form of processing such as, for example, a calculation of a maximum value, a calculation of a minimum value, a calculation of a median, a linear calculation and/or a spline function calculation and performs an interpolation calculation of a lattice point. The other two second interpolation circuits 131 and 132 individually operate in a similar manner.

Similarly, the second address generation circuit 121 calculates addresses in accordance with the expression (2) given below and reads out voxel data of the memory 112 or 113 using the addresses in units of a column for the voxel columns arranged linearly:

$$[x_2 y_2 z_2 1] = [x_1'y_1'z_1'] \begin{bmatrix} b_{11} & 0 & b_{12} & 0 \\ 0 & 1 & 0 & 0 \\ b_{21} & 0 & b_{22} & 0 \\ 0 & 0 & b_{32} & 1 \end{bmatrix} \quad (2)$$

where $[x_2\ y_2\ z_2\ 1]$ represents coordinates from which data are to be read out, and $[x_1\ 'y_1'z_1'1]$ represents coordinates of one of the memories 112 and 113 which is not performing writing under the control of the second input change-over circuit 141.

Similarly, the third address generation circuit calculates addresses in accordance with the expression (3) given below and reads out voxel data of the memory 114 or 115 using the addresses in units of a column for the voxel columns arranged linearly:

$$[x_3 y_3 z_3 1] = [x_2'y_2'z_2'1] \begin{bmatrix} c_{11} & c_{12} & 0 & 0 \\ c_{21} & c_{22} & 0 & 0 \\ 0 & 0 & 1 & 0 \\ c_{31} & c_{32} & 0 & 1 \end{bmatrix} \quad (3)$$

where $[x_3\ y_3\ z_3\ 1]$ represents coordinates from which data are to be read out, and $[x_2\ 'y_2\ 'z_2\ '1]$ represents coordinates of one of the memories 114 and 115 which is not performing writing under the control of the third input change-over circuit 142.

Integrated three-dimensional affine transform of the expressions (1) to (3) given hereinabove is described in accordance with the following expression (4):

$$[xyz1] = [x'y'z'1] \begin{bmatrix} 1 & 0 & 0 & 0 \\ 0 & a_{11} & a_{12} & 0 \\ 0 & a_{21} & a_{22} & 0 \\ 0 & 0 & 0 & 1 \end{bmatrix} \begin{bmatrix} b_{11} & 0 & b_{12} & 0 \\ 0 & 1 & 0 & 0 \\ b_{21} & 0 & b_{22} & 0 \\ 0 & 0 & b_{32} & 1 \end{bmatrix} \begin{bmatrix} c_{11} & c_{12} & 0 & 0 \\ c_{21} & c_{22} & 0 & 0 \\ 0 & 0 & 1 & 0 \\ c_{31} & c_{32} & 0 & 1 \end{bmatrix} \quad (4)$$

$$= [x'y'z'1] \begin{bmatrix} b_{11}c_{11} & b_{11}C_{12} & B_{12} & 0 \\ a_{12}b_{21}c_{11} + a_{11}c_{21} & a_{12}b_{21}c_{12} + a_{11}c_{22} & a_{12}b_{22} & 0 \\ a_{22}b_{21}c_{11} + a_{21}c_{21} & a_{22}b_{21}c_{12} + a_{21}c_{22} & a_{22}b_{22} & 0 \\ c_{31} & c_{32} & b_{32} & 1 \end{bmatrix}$$

where [x y z 1] represents coordinates from which data are to be read out, and [x'y'z'1] represents coordinates before such reading out.

By dividing affine transform into three affine transform stages and constituting the three-dimensional memory at each of the three affine transform stages as a double buffer memory to allow simultaneous parallel processing, high speed image processing can be realized.

Actually, the three-dimensional affine transform is realized by setting coefficients of the two-dimensional airline transform matrices of the expressions (1) to (3) in such a manner as illustrated In FIG. 10.

Having now fully described the invention, it will be apparent to one of ordinary skill in the art that many changes and modifications can be made thereto without departing from the spirit and scope of the invention as set forth herein.

What is claimed is:

1. A three-dimensional image processing method wherein a three-dimensional digital image stored in a first three-dimensional memory is read out by successively designating addresses of voxels by ray tracing processing, comprising the steps of:

calculating first addresses along a ray by ray tracing of a two-dimensional digital differential analyzer on a first plane coordinate system of a three-dimensional coordinate system;

successively designating first plane coordinate points on the first plane coordinate system with the calculated first addresses, successively reading out data of first voxel columns, said first voxel columns being arranged in the three-dimensional coordinate system along straight lines perpendicular to the ray at the first plane coordinate points, in units of a column from said first three-dimensional memory and storing the read out data of first voxel columns into a second three-dimensional memory;

calculating second addresses along the ray by ray tracing of the two-dimensional digital differential analyzer on a second plane coordinate system of the three-dimensional coordinate system, said second plane coordinate system being perpendicular to the first plane coordinate system;

successively designating second plane coordinate points on the second plane coordinate system with the calculated second addresses, reading out data of second voxel columns, said second voxel columns being arranged in the three-dimensional coordinate system along straight lines perpendicular to the ray at the second plane coordinate points, in units of a column from said second three-dimensional memory;

performing ray tracing of the two-dimensional digital differential analyzer for a plurality of rays, said plurality of rays being parallel to each other on a third plane coordinate system of the three-dimensional coordinate system, and calculating third addresses for each of the plurality of rays; and extracting the data of second voxel columns read out from said second three-dimensional memory which are designated by the calculated third addresses.

2. A three-dimensional image processing apparatus, comprising:

first and second three-dimensional memories for storing a three-dimensional digital image for voxels in a three-dimensional space;

a first two-dimensional digital differential analyzer address generation circuit for generating first addresses along a ray on a first plane coordinate system of a three-dimensional coordinate system;

means for successively designating first plane coordinate points on the first plane coordinate system with the generated first addresses, successively reading out data of first voxel columns, said first voxel columns being arranged in the three-dimensional coordinate system along a straight line perpendicular to the ray at the first plane coordinate points, in units of a column from said first three-dimensional memory and writing the read out data of first voxel columns into said second three-dimensional memory;

a second two-dimensional digital differential analyzer address generation circuit for generating second addresses along the ray on a second plane coordinate system, of the three-dimensional coordinate system, said second plane coordinate system being perpendicular to the first plane coordinate system;

read out means for successively designating second plane coordinate points of the second plane coordinate system with the generated second addresses, reading out data of second voxel columns, said second voxel columns being arranged in the three-dimensional coordinate system along a straight line perpendicular to the ray at the second plane coordinate points, in units of a column from said second three-dimensional memory;

a third two-dimensional digital differential analyzer address generation circuit for performing ray tracing for a plurality of rays, said plurality of rays being parallel to each other on a third plane coordinate system of the three-dimensional coordinate system, and generating third addresses along each one of the plurality of rays; and means for extracting the data of second voxel columns read out from said second three-dimensional memory which are designated by the generated third addresses.

3. A three-dimensional image processing apparatus as claimed in claim 2, further comprising a third three-dimensional memory, and change-over means for changing over a writing operation and a reading out operation between the second three-dimensional memory and the third three-dimensional memory.

4. A three-dimensional image processing apparatus as claimed in claim 2, further comprising an interpolation circuit interposed between said first and second three-dimensional memories for interpolating data.

5. A three-dimensional image processing apparatus comprising:

a first three-dimensional memory for storing a three-dimensional image;

a first address generator coupled to said first three-dimensional memory over a first address bus, said first address generator utilizing two-dimensional differential analysis to generate first reference direction addresses and first non-reference direction addresses corresponding to a first plane of a three-dimensional coordinate system;

a second three-dimensional memory and a third three-dimensional memory; and a first data bus which couples said first three-dimension memory with said second three-dimensional memory and said third three-dimensional memory, wherein first reference direction data of first voxel columns corresponding to said first reference direction addresses are read out in units of a column from the first three-dimensional memory and are stored in said second three-dimensional memory, said first voxels columns being perpendicular to said first plane, and wherein first non-reference direction data of second voxel columns corresponding to said first non-reference direction addresses are read out in units of a column from the first three-dimensional memory and are stored in said third three-dimensional memory, said second voxels columns being perpendicular to said first plane.

6. The three-dimensional image processing apparatus as recited in claim 5, further comprising:

a second address generator coupled to said second three-dimensional memory and said third three-dimensional memory over a second address bus, said second address generator utilizing two-dimensional differential analysis to generate second reference direction addresses and second non-reference direction addresses corresponding to a second plane of the three-dimensional coordinate system; and a second data bus coupled to said second three-dimensional memory and said third three-dimensional memory, wherein one of a second reference direction data of third voxel columns and a second non-reference direction data of fourth voxels columns are selectively written to said second data bus, wherein said second reference direction data of third voxel columns correspond to said second reference direction addresses, said third voxels columns being perpendicular to said second plane, and said second non-reference direction data of fourth voxel columns correspond to said second non-reference direction addresses, said fourth voxels columns being perpendicular to said second plane.

7. The three-dimensional image processing apparatus as recited in claim 6, further comprising:

a plurality of multiplexers coupled to said second data bus; and a plurality of respective third address generators coupled to said plurality of multiplexers over a plurality of respective third address buses, each of said plurality of respective third address generators utilizing two-dimensional differential analysis to generate third reference direction addresses and third non-reference direction addresses corresponding to a third plane of the three-dimensional coordinate system.

8. The three-dimensional image processing apparatus as recited in claim 7, wherein said plurality of respective third address generators generate said third reference direction addresses and said third non-reference direction addresses in accordance with a plurality of rays, said plurality of rays being parallel to each other and parallel to an arbitrary view direction ray.

9. The three-dimensional image processing apparatus as recited in claim 7, further comprising:

a fourth three-dimensional memory and a fifth three-dimensional memory;

a fourth address generator coupled to said fourth three-dimensional memory and said fifth three-dimensional memory over a fourth address bus, said second address generator utilizing two-dimensional differential analysis to generate said second reference direction addresses and said second non-reference direction addresses corresponding to said second plane of the three-dimensional coordinate system;

a third data bus coupled to said fourth three-dimensional memory and said fifth three-dimensional memory;

a demultiplexer which is coupled to said first three-dimensional memory as input and which provides a first output to said first data bus and a second output to said third data bus, wherein said demultiplexer selectively outputs data from said first three-dimensional memory to one of the first data bus and the third data bus; and a data bus multiplexer which is coupled to said first data bus and said third data bus as inputs and which is coupled to said second data bus as an output, wherein said data bus multiplexer selectively inputs data from one of said first data bus and said third data bus, said demultiplexer and data bus multiplexer being configured such that the demultiplexer selects the first data bus for output when the data bus multiplexer selects the third data bus for input and the demultiplexer selects the third data bus for output when the data bus multiplexer selects the first data bus for input.

* * * * *